Feb. 14, 1939.   H. BAILEY   2,147,187
COMPASS SWINGING APPARATUS FOR USE IN CONNECTION WITH AIRCRAFT
Filed Dec. 16, 1937   3 Sheets-Sheet 1
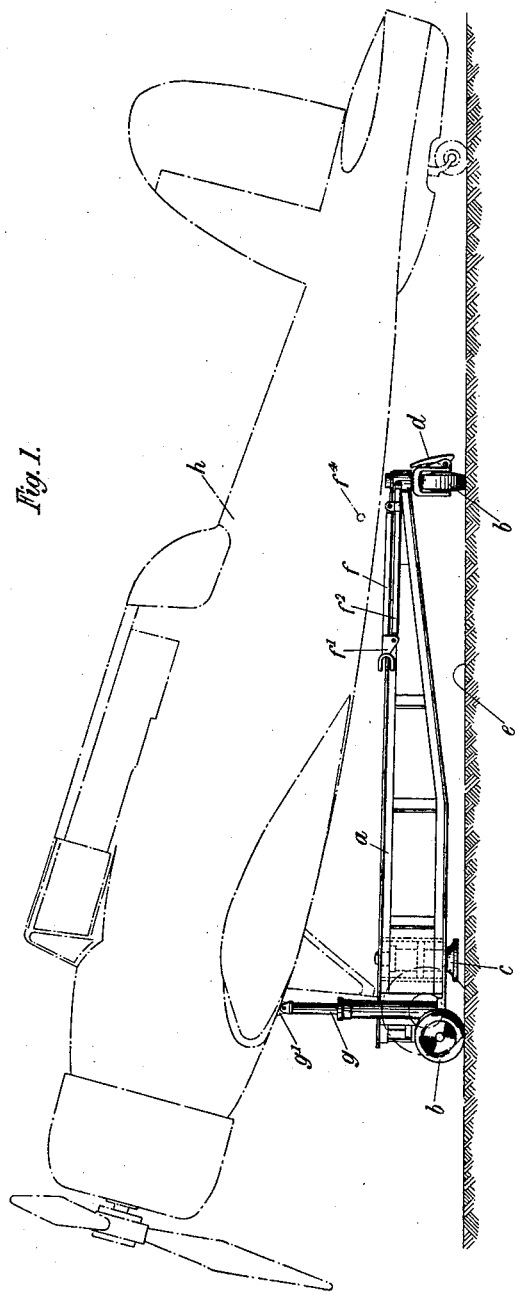

Feb. 14, 1939.   H. BAILEY   2,147,187
COMPASS SWINGING APPARATUS FOR USE IN CONNECTION WITH AIRCRAFT
Filed Dec. 16, 1937   3 Sheets-Sheet 2
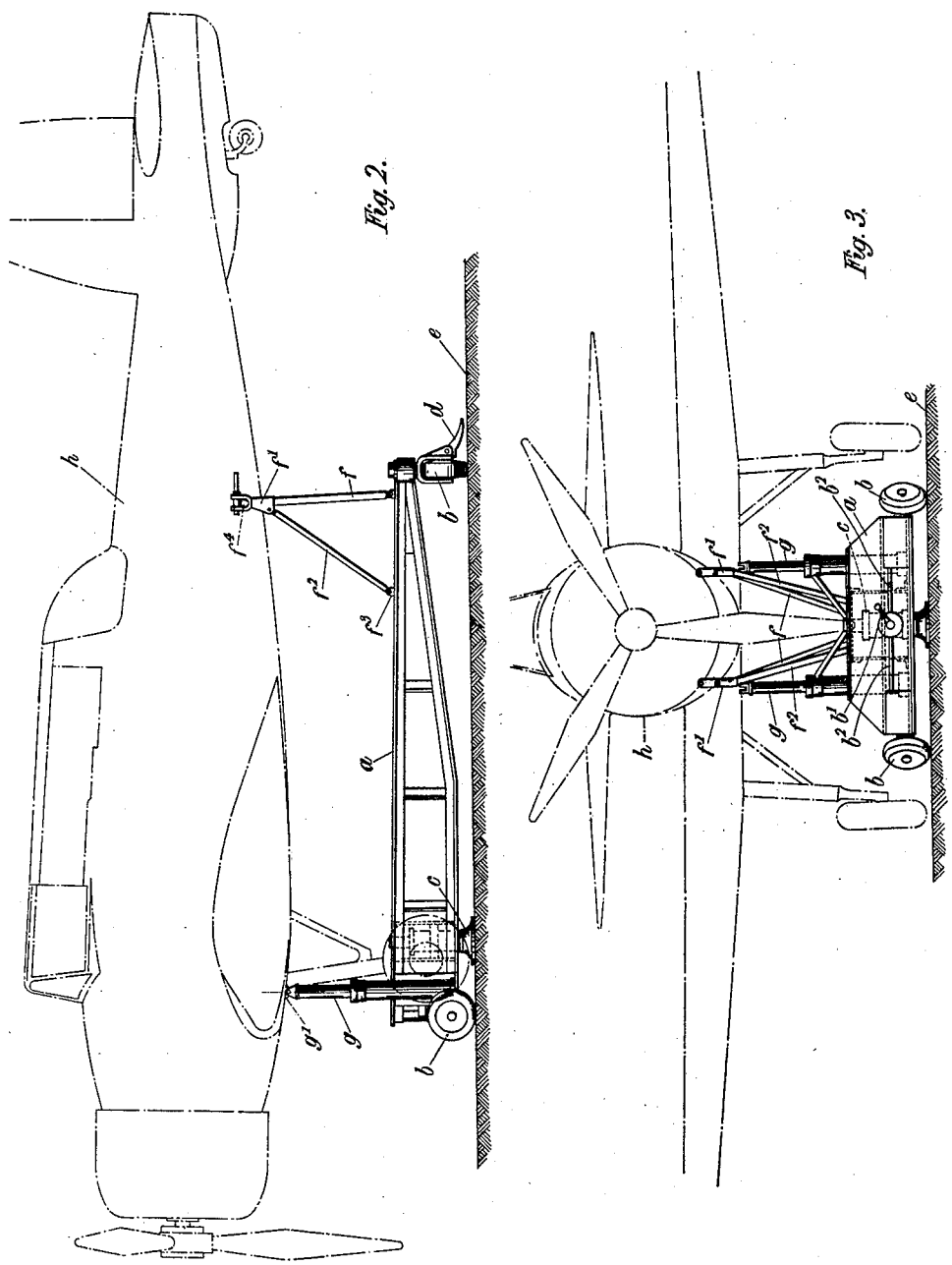

Feb. 14, 1939.   H. BAILEY   2,147,187
COMPASS SWINGING APPARATUS FOR USE IN CONNECTION WITH AIRCRAFT
Filed Dec. 16, 1937   3 Sheets-Sheet 3

Patented Feb. 14, 1939

2,147,187

UNITED STATES PATENT OFFICE 2,147,187

COMPASS SWINGING APPARATUS FOR USE IN CONNECTION WITH AIRCRAFT

Henry Bailey, Brough, near Hull, England, assignor to Blackburn Aircraft Limited, Brough, near Hull, England Application December 16, 1937, Serial No. 180,223
In Great Britain January 1, 1937

6 Claims. (Cl. 254—87)

This invention relates to compass swinging apparatus for use in connection with aircraft.

The object of this invention is to provide apparatus whereby the aircraft can be easily and definitely positioned and swung above the compass swinging base.

According to this invention, the apparatus comprises, in combination, a ground-engaging jack, a trolley rotatably mounted on the said jack to turn about the axis of the jack, wheels on said trolley adapted to run in circular paths centred on the axis of said jack and means for supporting the aircraft in a fixed position on the trolley including means for raising the aircraft clear of the compass swinging base.

A preferred form of construction in which the apparatus comprises a single unit will be described with reference to the accompanying drawings, in which:—

Fig. 1 is a side elevation of the jacking trolley on the compass swinging base with an aeroplane in position ready for attachment to and support upon the jacking trolley.

Fig. 2 is a similar view of the same parts as shown in Fig. 1 but with the aeroplane supported on the trolley and the trolley positioned on the base ready for compass swinging.

Fig. 3 is a front elevation of the parts in the same position as that shown in Fig. 2.

Figure 4:
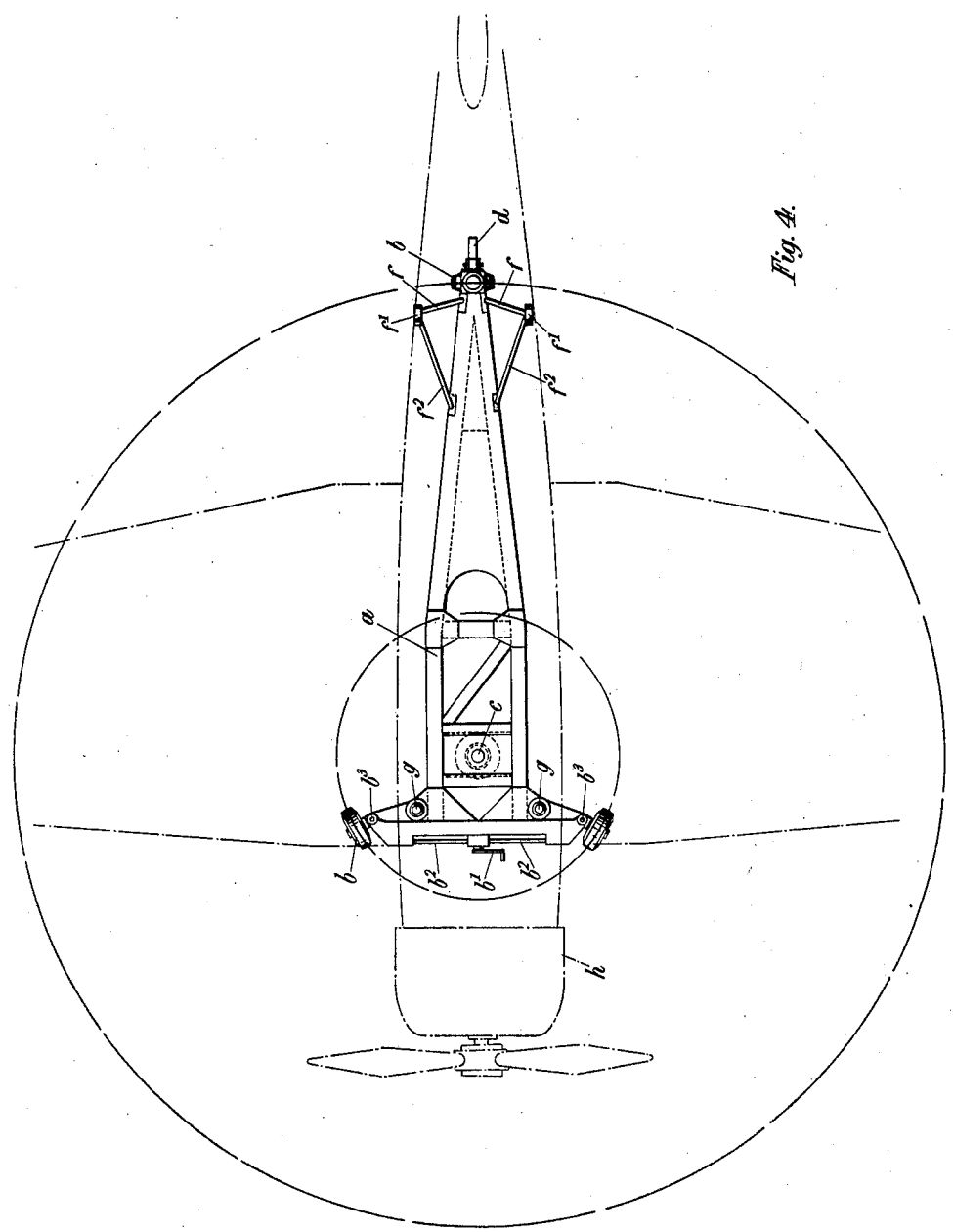
Fig. 4 is a plan view.

As shown, the apparatus comprises a jacking trolley built up of a chassis $a$ of substantially T-shape in plan with three castor wheels $b$ arranged one at each end of the arms of the T. These castor wheels are so mounted on the chassis that they can be set to run either longitudinally of the chassis or on an arc or arcs struck from the centre of the downwardly extensible locating jack $c$ fixed to the chassis, and having a base sufficiently large to provide a friction grip on the concrete compass swinging base. The forward wheels $b$ are adjustable for this purpose by the handle $b^1$ which acts through suitable known gearing to push out or pull in two rods $b^2$ which are so connected to the wheels as to rock them about their pivots $b^3$ on the chassis. The rear castor wheel is free to rotate in the chassis and so take up any desired relation thereto to suit the movements of the chassis.

On the rear castor wheel a pointer $d$ is pivotally mounted so that it can be either turned up as shown in Fig. 1 or turned down so as to lie close to the compass swinging base indicated at $e$ as shown in Figs. 2 and 4.

The chassis is provided at its rear with a pair of collapsible struts each consisting of a post $f$ permanently attached at its one end to the chassis frame and carrying a yoke $f^1$ at the other, and a stay $f^2$ pivoted to said yoke, adapted to lie flat under the post when collapsed, but to be adjusted forwardly to form with the post a right angle triangle based on the chassis, to which it is attached by the lug $f^3$ and a removable pin, not shown. The strut is adapted to engage with projections $f^4$ on the fuselage of the aeroplane.

At its forward end the chassis is provided with two jacks $g$ one at each side of the longitudinal centre thereof adapted to be extended upwards and to be attached to lugs $g^1$ on the underside of the wing roots of the aeroplane $h$, as shown in Figs. 1 to 3.

In use the trolley is moved on to the compass swinging base $e$ with the locating jack $c$ over the centre of the base, and then the aeroplane is wheeled into a position in which its lugs $g^1$ are over the jacks $g$ and the tail is over the tail of the trolley. The jacks $g$ are now attached to the lugs $g^1$ and the tail of the aeroplane is lifted and the projections $f^4$ engaged in the yokes $f^1$ of the collapsible struts. The jacks $g$ and $c$ are now extended to bring the landing gear of the aeroplane, if extended, clear of the ground and to cause the load acting on the base of the jack $c$ to retain the trolley on the centre of the compass swinging base with the wheels $b$ just bearing lightly thereon.

The centre line of the aircraft is thus accurately positioned relatively to the centre of the compass base and by pushing the tail of the aircraft around until the ground pointer $d$ on the tail trolley corresponds with the requisite line on the ground the aircraft can be instantly and accurately aligned on any heading which is required.

The compass adjuster can thus be certain that, without leaving the cockpit to check it, the possibility of error in alignment is negligible, even though the aircraft is handled by the most unskilled personnel.

With the compass swinging apparatus, according to this invention, the possibility of mis-alignment of the aircraft is greatly reduced, particularly in windy weather. This is due to the elimination of plumb bobs on necessarily long lines and also to the fact that, the front end of the aircraft being positively positioned at the start of the compass swinging operation, the only possible error is in aligning the tail. As this is achieved by bringing permanent pointers on the trolley over the appropriate mark on the compass base, the possibility of error is greatly reduced.

A further advantage of the apparatus is that the time necessary to change from one heading to the next is reduced to a minimum, due to the fact that a simple movement of the trolley only is necessary.

The handling of the aircraft can be effected by two men, while the aircraft is actually on the compass base.

Swinging compasses by landing compass can be carried out without the necessity of taxiing the aircraft about the aerodrome.

In the case of war or other emergency, compass swinging can be effected in a field by simply providing a centre peg in a small patch of concrete large enough to support the head of the locating jack c and providing pegs to indicate headings for the trolley positions.

In the case of aeroplanes with retractable landing gears, the aeroplane can be supported on the trolley with its landing gear retracted, the aeroplane being moved into position on its landing gear and then the landing gear is retracted to bring it clear of the ground, in which case the raising jacks need not be brought into use.

What I claim as my invention and desire to secure by Letters Patent is:—

1. Compass swinging apparatus for aircraft comprising, in combination, a ground-engaging jack, a trolley rotatably mounted on said jack so that it can turn about the axis of the jack, wheels on said trolley arranged to run in circular paths centred on the axis of the jack and means for supporting aircraft in a fixed position on said trolley, said means including means for raising said aircraft clear of the compass swinging base.

2. Compass swinging apparatus for aircraft comprising, in combination, a ground-engaging jack, a trolley rotatably mounted on said jack so that it can turn about the axis of the jack, wheels on said trolley arranged to run in circular paths centred on the axis of the jack, means on said trolley adapted to engage with at least three points on the aircraft, said means including means for raising the aircraft clear of the compass swinging base and a pointer on said trolley for indicating its bearings.

3. Compass swinging apparatus for aircraft comprising, in combination, a ground-engaging jack, a trolley rotatably mounted on said jack so that it can turn about the axis of the jack, wheels on said trolley arranged to run in circular paths centred on the axis of the jack, jacks on said trolley for engaging with at least two points on the aircraft and for raising and supporting the aircraft on said trolley clear of the compass swinging base and means on said trolley for supporting the tail of the aircraft.

4. Compass swinging apparatus for aircraft comprising, in combination, a downwardly extensible jack, a trolley rotatably mounted on said jack so that it can turn about the axis of the jack, wheels on said trolley arranged to run in circular paths centred on the axis of the jack and upwardly extensible jacks on said trolley for raising and supporting the aircraft clear of the compass swinging base, and means on said trolley for supporting the tail of the aircraft.

5. Compass swinging apparatus for aircraft comprising, in combination, a ground-engaging jack, a trolley rotatably mounted on said jack so that it can turn about the axis of the jack, wheels on said trolley arranged to turn about vertical axes on the trolley, means for setting said wheels in either of two positions, in one of which they run in a circular path centred on the axis of the jack and in the other of which they run longitudinally of the trolley, and means for supporting aircraft on said trolley clear of the compass swinging base.

6. Compass swinging apparatus for aircraft comprising, in combination, a downwardly extensible ground-engaging jack, a trolley rotatably mounted on said jack so that it can be arranged to turn about a predetermined axis on a compass swinging base, two fore wheels on said trolley mounted to turn about vertical axes, means for setting the wheels in one of two positions, in one of which they run in circular paths centred on the axis of the jack and in the other of which positions they run longitudinally of said trolley, at least one aft wheel on the trolley mounted to turn freely about a vertical axis, two upwardly extensible jacks on said trolley for engaging with two points on the forward end of the aircraft and for raising and supporting it on the trolley clear of the compass swinging base, a collapsible strut for supporting the tail end of the aircraft clear of the compass swinging base, said upwardly extensible jacks and strut maintaining the aircraft in a fixed position relatively to the trolley and a pointer on the trolley adapted to indicate the bearing of the trolley on the base.

HENRY BAILEY.